(12) United States Patent
Takahara

(10) Patent No.: US 9,254,614 B2
(45) Date of Patent: Feb. 9, 2016

(54) TIRE PUNCTURE SEALANT

(75) Inventor: Hideyuki Takahara, Kanagawa-ken (JP)

(73) Assignee: The Yokohama Rubber Co., LTD. (JP)

( * ) Notice: Subject to any disclaimer, the term of this patent is extended or adjusted under 35 U.S.C. 154(b) by 150 days.

(21) Appl. No.: 13/207,354

(22) Filed: Aug. 10, 2011

(65) Prior Publication Data

US 2012/0041099 A1 Feb. 16, 2012

(30) Foreign Application Priority Data

Aug. 11, 2010 (JP) ................................. 2010-180095

(51) Int. Cl.
*B29C 73/16* (2006.01)

(52) U.S. Cl.
CPC .................... *B29C 73/163* (2013.01)

(58) Field of Classification Search
USPC ........................................................ 523/166
See application file for complete search history.

(56) References Cited

U.S. PATENT DOCUMENTS

| | | | |
|---|---|---|---|
| 5,059,648 A * | 10/1991 | Fukushima et al. | 524/376 |
| 5,772,747 A * | 6/1998 | Turner et al. | 106/33 |
| 6,454,892 B1 * | 9/2002 | Gerresheim et al. | 156/115 |
| 7,745,511 B2 | 6/2010 | Okamatsu et al. | |
| 2002/0121331 A1 | 9/2002 | Gerresheim et al. | |
| 2007/0203260 A1 | 8/2007 | Okamatsu | |
| 2009/0122401 A1* | 5/2009 | Shinagawa et al. | 359/485 |
| 2010/0152323 A1* | 6/2010 | Okamatsu | 523/166 |

FOREIGN PATENT DOCUMENTS

| | | |
|---|---|---|
| CN | 101077968 | 11/2007 |
| DE | 10 2008 033 514 | 2/2009 |
| JP | 09-118779 | 5/1997 |
| JP | 2007-224231 | 9/2007 |
| JP | 2007-224232 | 9/2007 |
| JP | 2007-224245 | 9/2007 |
| JP | 2007-224246 | 9/2007 |
| JP | 2007-224248 | 9/2007 |
| JP | 2010-043155 | 2/2010 |

OTHER PUBLICATIONS

Machine Translation of JP 2010-043155.*
Chinese Office Action dated Jan. 15, 2013.
Japanese Office Action dated Jan. 15, 2013.
TMDD, Wikipedia, retrived Dec. 11, 2015 under https://de.wikipedia.org/wiki/TMDD.

* cited by examiner

*Primary Examiner* — Nicole M Buie-Hatcher
*Assistant Examiner* — Chelsea M Christensen
(74) *Attorney, Agent, or Firm* — Thorpe North & Western

(57) ABSTRACT

A tire puncture sealant including a rubber latex and/or a resin emulsion, and an acetylene alcohol and/or a derivative thereof.

19 Claims, No Drawings

TIRE PUNCTURE SEALANT

PRIORITY CLAIM

Priority is claimed to Japan Patent Application Serial No. 2010-180095 filed on Aug. 11, 2010.

BACKGROUND

1. Technical Field

The present technology relates to a tire puncture sealant.

2. Related Art

Automobile manufacturers are more frequently providing puncture repair kits as standard or optional equipment. Such puncture repair kits include a tire puncture sealant as an essential component, but can also include a compressor as an optional component. Actual products are generally compact packages that combine the tire puncture sealant, known as an "emergency tire puncture repairing agent" or the like, and a low capacity compressor that draws power via a cigarette lighter socket.

Tire puncture sealants like those described above are typically introduced into a tire. After the tire is filled with air to a desired air pressure, the tire puncture sealant reaches a puncture hole as a result of the vehicle running a specific distance. Moreover, aggregates of rubber particles or resin particles in the tire puncture sealant form due to compressive forces and shear forces exerted on the tire as it rotates and contacts the ground, thereby sealing the puncture holes. As a result, the vehicle on which the tire is mounted can be driven to an automotive repair shop or gas station where the tire can be replaced.

To date, a variety of such tire puncture sealants (puncture sealants) has been proposed. For example, Japanese Unexamined Patent Application Publication No. H09-118779A describes "a puncture sealant for sealing a punctured tire, comprising a natural rubber latex." Japanese Unexamined Patent Application Publication No. 2007-224231A describes "a tire puncture sealant comprising a chloroprene emulsion and an antifreezing agent, wherein a hydrogen ion exponent is less than 9.0." Japanese Unexamined Patent Application Publication No. 2007-224232A describes "a tire puncture sealant comprising a urethane emulsion and an antifreezing agent." Japanese Unexamined Patent Application Publication No. 2007-224245A describes "a tire puncture sealant comprising a polyolefin emulsion and an antifreezing agent." Japanese Unexamined Patent Application Publication No. 2007-224246A describes "a tire puncture sealant comprising a synthetic resin emulsion and an antifreezing agent, wherein a hydrogen ion exponent is from 5.5 to 8.5." Japanese Unexamined Patent Application Publication No. 2007-224248A describes "a tire puncture sealant comprising an acrylic emulsion and an antifreezing agent." Japanese Unexamined Patent Application Publication No. 2010-43155A describes "a tire puncture sealant comprising a natural rubber latex, a synthetic resin emulsion, a tackifier, and an antifreezing agent, wherein a solid content compounding ratio (natural rubber latex/synthetic resin emulsion) of the natural rubber latex to the synthetic resin emulsion is from 80/20 to 30/70."

On the other hand, there are two usage forms of the puncture repair kit. One is "hand-squeezing" where the valve core is removed from the rim valve and then the tire puncture sealant is squeezed into the tire by hand. The other is "pressure injection" where compressed air of a compressor is used to inject the tire puncture sealant without removing the valve core from the rim valve.

Through diligent research into conventional tire puncture sealants, the present inventors discovered that while sealing performance and storage performance was excellent, when using compressed air of a compressor to inject a tire puncture sealant that has been heated to 70° C. as would be expected in the summer season, a large amount of aggregates are deposited on the valve core, leading to a decline in air inflation efficiency.

SUMMARY

The present technology provides a tire puncture sealant whereby sealing performance and storage performance are ensured and injectability is superior in elevated temperature conditions such as the summer season and the like. The tire puncture sealant can be obtained by compounding an acetylene alcohol and/or a derivative thereof in a tire puncture sealant including a rubber latex and/or a resin emulsion.

Specifically, the present technology includes the following (1) to (7):

(1) A tire puncture sealant including a rubber latex and/or a resin emulsion, and an acetylene alcohol and/or a derivative thereof.

(2) The tire puncture sealant described in (1), wherein the acetylene alcohol is expressed by Formula (1) or (2) below:

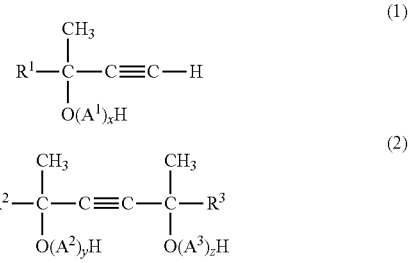

In the formulas, $R^1$, $R^2$, and $R^3$ are each independently an alkyl group having from 1 to 8 carbons; $A^1$, $A^2$, and $A^3$ are each independently an alkylene glycol group having from 2 to 3 carbons; and x, y, and z are each independently an integer from 0 to 60. When x, y, and z are integers of not less than 2, the plurality of $A^1$, $A^2$, and $A^3$, which correspond respectively, may each be the same or different.

(3) The tire puncture sealant described in (2), wherein in the Formulas (1) and (2), $R^1$, $R^2$ and $R^3$ are each independently an alkyl group having from 1 to 5 carbons.

(4) The tire puncture sealant described in any of (1) to (3), wherein a total of from 0.1 to 10 parts by mass of the acetylene alcohol and/or the derivative thereof is included per 100 parts by mass of a total solid content of the rubber latex and the resin emulsion.

(5) The tire puncture sealant described in any of (1) to (4), wherein the resin emulsion is an ethylene-vinyl acetate copolymer resin emulsion.

(6) The tire puncture sealant described in (5), wherein the rubber latex is a natural rubber latex and a solid content compounding ratio [solid content mass of the natural rubber latex/solid content mass of the ethylene-vinyl acetate copolymer resin emulsion] of the natural rubber latex to the ethylene-vinyl acetate copolymer resin emulsion is from 70/30 to 20/80.

(7) The tire puncture sealant described in (5) or (6), wherein the ethylene-vinyl acetate copolymer resin emulsion is an ethylene-vinyl acetate-vinyl versatate copolymer resin emulsion.

According to the present technology, a tire puncture sealant can be provided whereby sealing performance and storage performance are ensured and injectability is superior in elevated temperature conditions such as the summer season and the like.

DETAILED DESCRIPTION

A tire puncture sealant of the present technology is a tire puncture sealant including a rubber latex and/or a resin emulsion, and an acetylene alcohol and/or a derivative thereof.

Hereinafter, a description of each constituent of the tire puncture sealant of the present technology will be given.

Rubber Latex

The rubber latex for use in the tire puncture sealant of the present technology is not particularly limited, and a conventionally known rubber latex can be used.

Examples of the rubber latex include natural rubber latex, chloroprene latex, styrene butadiene rubber latex, acrylonitrile-butadiene rubber latex, styrene butadiene acrylic rubber latex, and the like.

A single rubber latex or a combination of two or more rubber latices can be used in the tire puncture sealant of the present technology. Additionally, a resin emulsion as described hereinafter can be combined and used.

Preferably, a natural rubber latex is used as the rubber latex, because such leads to a further enhancement of the sealing performance of the tire puncture sealant of the present technology.

Hereinafter, a description of the natural rubber latex will be given.

Natural Rubber Latex

The natural rubber latex is not particularly limited, and it is possible to use a rubber latex obtained by tapping the *Hevea brasiliensis* tree.

A so-called "deproteinized natural rubber latex", wherein protein is removed from the natural rubber latex, is preferably used as the natural rubber latex because such leads to being able to suppress decomposition using less ammonia, and preventing corrosion damage to steel cords and irritating odors caused by ammonia.

Examples of the natural rubber latex that can be used include Deproteinized Natural Rubber Latex (SeLatex series, manufactured by SRI Hybrid Ltd.), Deproteinized Natural Rubber Latex (HA, manufactured by Fulflex, Inc.), Ultra-low Ammonia Natural Rubber Latex (ULACOL, manufactured by Regitex Co., Ltd.), and the like.

Resin Emulsion

The resin emulsion for use in the tire puncture sealant of the present technology is not particularly limited, and a conventionally known resin emulsion can be used.

Examples of the resin emulsion include compounds emulsified using an emulsifying agent such as ethylene vinyl acetate-based emulsions, vinyl acetate-based emulsion, and the like; and compounds emulsified by introducing a carboxy group such as urethane emulsions, acrylic emulsions, acrylic urethane emulsions, polyolefin-based emulsions, polyvinyl chloride emulsions, and the like.

A single resin emulsion or a combination of two or more resin emulsions can be used in the tire puncture sealant of the present technology. Additionally, a combination of the rubber latex and the resin emulsion may be used.

Preferably, an ethylene-vinyl acetate copolymer resin emulsion is used as the resin emulsion because such leads to a further enhancement of injectability of the tire puncture sealant of the present technology in elevated temperature conditions.

Hereinafter, a description of the ethylene-vinyl acetate copolymer resin emulsion is given.

Ethylene-Vinyl Acetate Copolymer Resin Emulsion

The ethylene-vinyl acetate copolymer resin emulsion is a copolymer resin emulsion containing ethylene and vinyl acetate as monomeric units and is not particularly limited as long as it is an ethylene-vinyl acetate copolymer resin emulsion (hereinafter also referred to as "EVA emulsion").

Preferable examples of the EVA emulsion include an aqueous emulsion obtained by copolymerizing (emulsion polymerization) an ethylene monomer and a vinyl acetate monomer using an emulsification dispersant.

Here, a molar ratio (number of moles of the ethylene monomer/number of moles of the vinyl acetate monomer) of the ethylene monomer to the vinyl acetate monomer compounded at copolymerization is preferably from 10/90 to 40/60.

Examples of the emulsification dispersant include water-soluble polymers, nonionic surfactants, anionic surfactants, cationic surfactants, amphoteric ionic surfactants, and the like. Particularly, the emulsification dispersant is preferably a water-soluble polymer, and more preferably a polyvinylalcohol (PVA).

A weight-average molecular weight of the ethylene-vinyl acetate copolymer resin in the EVA emulsion is preferably from 10,000 to 500,000, and more preferably from 50,000 to 200,000.

Additionally, a solid content of, the EVA emulsion is preferably from 40 to 70 mass %, and more preferably from 50 to 65 mass %.

In the present technology, a commercially available product may be used as the EVA emulsion. Examples thereof include ethylene-vinyl acetate copolymer resin emulsion (Sumikaflex® S7400, S400HQ, S467, 510HQ, 1010; manufactured by Sumika Chemtex Co., Ltd.) and the like.

In the present technology, other monomers may be copolymerized as needed in the copolymerization described above. Examples of the other monomers include acrylic esters such as 2-ethylhexyl acrylate, butyl acrylate, ethyl acrylate, and the like; methacrylic acid esters such as methyl methacrylate, butyl methacrylate, and the like; vinyl esters such as vinyl chloride, vinyl versatate, and the like. Additionally, examples of the other monomers that can also be used include various monomers containing a functional group such as a sulfonic acid group, a hydroxy group, an epoxy group, a methylol group, an amino group, an amide group, and the like, in addition to monomers having a carboxyl group such as acrylic acid, methacrylic acid, and the like.

Vinyl versatate is preferably used as the monomer. In other words, an ethylene-vinyl acetate-vinyl versatate copolymer resin emulsion (hereinafter also referred to as "VEVA emulsion") including ethylene, vinyl acetate, and vinyl versatate as monomer units is also preferable as the ethylene-vinyl acetate copolymer resin emulsion.

In the present technology, a commercially available product may be used as the VEVA emulsion. Examples thereof include ethylene acetate-vinyl-vinyl versatate copolymer resin emulsion (Sumikaflex® 950HQ, 951HQ; manufactured by Sumika Chemtex Co., Ltd.) and the like.

The tire puncture sealant of the present technology can simultaneously include both the natural rubber latex and the ethylene-vinyl acetate copolymer resin emulsion, and a solid content compounding ratio [solid content mass of the natural rubber latex/solid content mass of the ethylene-vinyl acetate copolymer resin emulsion] of the natural rubber latex to the ethylene-vinyl acetate copolymer resin emulsion is preferably in a range from 70/30 to 20/80, and more preferably in a range from 50/50 to 20/80. When the ratio is within this range, sealing performance, storage performance, and injectability in elevated temperatures will be superior.

Acetylene Alcohol and/or Derivative Thereof.

The acetylene alcohol and/or derivative thereof for use in the tire puncture sealant of the present technology are not particularly limited, and a conventionally known acetylene alcohol and/or derivative thereof can be used.

Acetylene Alcohol

The acetylene alcohol is not particularly limited so long as it is an organic compound having at least one carbon-carbon triple bond and at least one alcoholic hydroxy group in the molecule.

Examples of the acetylene alcohol include compounds expresses by Formulas (1) and (2) below.

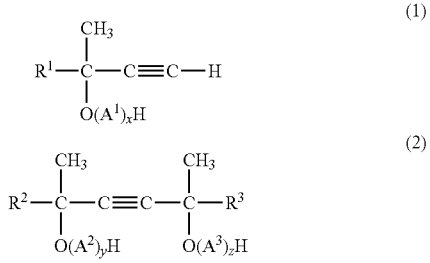

In the formulas, $R^1$, $R^2$, and $R^3$ are each independently an alkyl group having from 1 to 8 carbons; $A^1$, $A^2$, and $A^3$ are each independently an alkylene glycol group having from 2 to 3 carbons; and x, y, and z are each independently an integer from 0 to 60. When x, y, and z are integers of not less than 2, the plurality of $A^1$, $A^2$, and $A^3$, which correspond respectively, may each be the same or different.

A single acetylene alcohol may be used or a combination of two or more acetylene alcohols may be used.

In the Formulas (1) and (2), $R^1$, $R^2$, and $R^3$ are preferably each independently an alkyl group having from 1 to 5 carbons, and more preferably each independently an alkyl group having from 1 to 3 carbons. Such a range will lead to superior injectability following heating at 70° C.

Examples of the compounds expressed by the Formulas (1) and (2) include 3-methyl-1-butyne-3-ol, 3,5-dimethyl-1-hexyne-3-ol, 2,5-dimethyl-3-hexyne-2,5-diol, 2,4,7,9-tetramethyl-5-decyne-4,7-diol, and the like.

Acetylene Alcohol Derivative

The derivative of the acetylene alcohol is not particularly limited so long as it is a derivative of the acetylene alcohol, and examples thereof include esters, ethylene oxide adducts, and the like of the acetylene alcohol.

Examples of the ester include esters with lower fatty acids such as acetic acid, propionic acid, butyric acid, and the like.

Examples of the ethylene oxide adduct include ethylene oxide adducts of 3,5-dimethyl-1-hexyne-3-ol, ethylene oxide adducts of 2,4,7,9-tetramethyl-5-decyne-4,7-diol, and the like.

In the present technology, a commercially available product may be used as the acetylene alcohol. Examples thereof include Olfine® EXP. 4200 [a mixture of the compounds expressed by the Formulas (1) and (2) (in the formulas, $R^1$, $R^2$, and $R^3$ are each independently an alkyl group having from 1 to 5 carbons; $A^1$, $A^2$, and $A^3$ are each independently an alkylene glycol group having from 2 to 3 carbons; and x, y, and z are integers from 0 to 60. Note that when x, y, and z are integers of not less than 2, the plurality of $A^1$, $A^2$, and $A^3$, which correspond respectively, are the same.), which is a different composition from Olfine® EXP. 4123], Olfine® EXP. 4123 [a mixture of the compounds expressed by the Formulas (1) and (2) (in the formulas, $R^1$, $R^2$, and $R^3$ are each independently an alkyl group having from 1 to 5 carbons; $A^1$, $A^2$, and $A^3$ are each independently an alkylene glycol group having from 2 to 3 carbons; and x, y, and z are integers from 0 to 60. Note that when x, y, and z are integers of not less than 2, the plurality of $A^1$, $A^2$, and $A^3$, which correspond respectively, are the same.), which is a different composition from Olfine® EXP. 4200], both manufactured by Nissin Chemical Co., Ltd., and the like.

The tire puncture sealant of the present technology preferably includes from 0.1 to 10 parts by mass, more preferably from 0.1 to 5 parts by mass, and even more preferably from 1 to 3 parts by mass of the acetylene alcohol and/or derivative thereof per 100 parts by mass of a total solid content of the rubber latex and the resin emulsion.

Other Optional Constituents

In addition to the constituents mentioned above, the tire puncture sealant of the present technology may include various additives such as antifreezing agents, tackifiers, gelling agents, fillers, antiaging agents, antioxidants, pigments (dyes), plasticizers, thixotropic agents, UV absorbents, flame retardants, surfactants (including leveling agents), dispersants, dehydrating agents, antistatic agents, and the like.

Antifreezing Agent

The antifreezing agent is not particularly limited, and a conventionally known antifreezing agent can be used.

Examples of the antifreezing agent include ethylene glycol, propylene glycol, diethylene glycol, and the like. A single antifreezing agent may be used or a combination of two or more antifreezing agents may be used.

An amount of a solid content of the antifreezing agent in the tire puncture sealant of the present technology is preferably from 100 to 300 parts by mass, more preferably from 100 to 200 parts by mass, and even more preferably from 100 to 150 parts by mass per 100 parts by mass of a total solid content of the rubber latex and/or the resin emulsion.

If the amount of the solid content of the antifreezing agent is within this range, anti-freezing performance of the obtained tire puncture sealant of the present technology will be superior.

Here, "solid content of the antifreezing agent" refers to a total of the constituents included in the antifreezing agent, minus water and solvents.

Tackifier

The tackifier is not particularly limited, and a conventionally known tackifier can be used.

Examples of the tackifier include rosin resins such as rosin esters, polymerized rosin esters, modified rosins, and the like; terpene resins such as terpene phenols, aromatic terpenes, and the like; hydrogenated terpene resins (terpene resins to which hydrogen has been added); phenolic resins; xylene resins; and the like. A single tackifier may be used or a combination of two or more tackifiers may be used.

Among these resins, the tackifier preferably includes at least one selected from the group consisting of rosin resins, terpene resins, and hydrogenated terpene resins because such leads to the sealing performance of the obtained tire puncture sealant of the present technology being enhanced.

Moreover, these resins are preferably compounded in the tire puncture sealant of the present technology as an emulsion because this leads to superior compatibility with the rubber latex and the resin emulsion.

An amount of a solid content of the tackifier in the tire puncture sealant of the present technology is preferably from 10 to 100 parts by mass, more preferably from 10 to 50 parts by mass, and even more preferably 10 to 30 parts by mass per 100 parts by mass of a total solid content of the rubber latex and/or the resin emulsion.

If the amount of the solid content of the tackifier is within this range, sealing performance of the obtained tire puncture sealant of the present technology will be further enhanced.

Here, "solid content of the tackifier" refers to a total of the constituents included in the tackifier, minus water and solvents.

Gelling Agent

The gelling agent is not particularly limited, and examples thereof include alginic acid derivatives, cellulose derivatives, and the like. A single gelling agent may be used or a combination of two or more gelling agents may be used.

Including such a gelling agent further enhances the sealing performance of the tire puncture sealant of the present technology.

It is thought that the sealing performance is enhanced because the gelling agent absorbs the water and the antifreezing agent, slightly destabilizes the particles, and facilitates coagulation when sealing.

An amount of the gelling agent in the present technology is preferably from 1.0 to 5.0 parts by mass and more preferably from 1.0 to 3.0 parts by mass per 100 parts by mass of a total solid content of the rubber latex and/or the resin emulsion.

Filler

The filler is not particularly limited, and examples thereof include organic and inorganic fillers of various forms. Examples thereof include fumed silica, calcined silica, precipitated silica, pulverized silica, molten silica; diatomaceous earth; iron oxide, zinc oxide, titanium oxide, barium oxide, magnesium oxide; calcium carbonate, magnesium carbonate, zinc carbonate; pyrophyllite clay, kaolin clay, calcined clay; carbon black; fatty acid treated products, resin acid treated products, urethane compound treated products, and fatty acid ester treated products thereof; and the like.

Antiaging Agent

The antiaging agent is not particularly limited, and examples thereof include hindered phenol-based compounds and the like.

Antioxidant

The antioxidant is not particularly limited, and examples thereof include butylhydroxytoluene (BHT), butylhydroxyanisole (BHA), and the like.

Pigment

The pigment is not particularly limited, and examples thereof include inorganic pigments such as titanium oxide, zinc oxide, ultramarine, iron red, lithopone, lead, cadmium, iron, cobalt, aluminum, hydrochlorides, sulfates, and the like; organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments, carbon black, and the like; and the like.

Plasticizer

The plasticizer is not particularly limited, and examples thereof include diisononyl phthalate (DINP); dioctyl adipate and indecyl succinate; di(ethylene glycol) dibenzoate and pentaerythritol esters; butyl oleate and methyl acetyl ricinoleate; tricresyl phosphate and trioctyl phosphate, propylene glycol adipate polyesters and butylene glycol adipate polyesters; and the like.

Thixotropic Agent

The thixotropic agent is not particularly limited, and examples thereof include Aerosil (manufactured by Nippon Aerosil), Disparlon (manufactured by Kusumoto Chemicals, Ltd.), and the like.

Flame Retardant

The flame retardant is not particularly limited, and examples thereof include chloroalkyl phosphates, dimethylmethyl phosphates, bromine-phosphorus compounds, ammonium polyphosphates, neopentyl bromide-polyethers, brominated polyethers, and the like.

Surfactants

Examples of the surfactant include anionic surfactants such as an alkali metal salt of rosin, alkylbenzene sulfonate, polyoxyethylene alkyl phenyl ether sulfate ester salt, alkylnaphthalene sulfonate, polyoxy-mono and di-styryl phenylether monoester sulfosuccinate, alkylphenoxy polyoxyethylene propyl sulfonate, and the like; nonionic surfactants such as polyoxyethylene alkyl ether, polyoxyethylene alkylphenyl ether, and the like; cationic surfactants such as tetraalkyl ammonium chloride, trialkyl benzyl ammonium chloride, alkylamine, monooxyethylene alkylamine, polyoxyethylene alkylamine, and the like; and the like.

Of these surfactants, the present technology preferably includes a surfactant containing a carbonyl group.

Antistatic Agent

The antistatic agent is not particularly limited, and examples thereof include quaternary ammonium salts; hydrophilic compounds such as polyglycols, ethylene oxide derivatives, and the like; and the like.

Method of Producing the Tire Puncture Sealant

A method of producing the tire puncture sealant of the present technology is not particularly limited.

Examples thereof include methods wherein the rubber latex and/or the resin emulsion, the acetylene alcohol and/or derivative thereof, and optionally the antifreezing agent, the tackifier, and the other constituents that may be included are placed in a reaction vessel, and then thoroughly kneaded in vacuo using a mixer such as a combination mixer or the like.

Method of Using the Tire Puncture Sealant

Next, a method of using the tire puncture sealant of the present technology will be described. However, the method of using the tire puncture sealant of the present technology is not limited to the following method.

First, the tire puncture sealant of the present technology is injected into a tire via an air-filling part of the tire.

The method for injecting the tire puncture sealant of the present technology into the tire is not particularly limited and a conventionally known method can be used. Examples thereof include a method involving use of a syringe or a spray can. An amount of the tire puncture sealant injected into the tire is not particularly limited, and is selected as appropriate depending on, for example, the size of the puncture hole.

Next, the tire is filled with air until a predetermined air pressure is reached.

Then, the vehicle is driven a predetermined distance.

Aggregates of synthetic resin particles and the like are formed by compressive forces and shear forces exerted when the tire rotates and comes into contact with the ground, thereby enabling sealing of the puncture hole.

EXAMPLES

1. Preparation of the Tire Sealant Composition

The components shown in Table 1 were blended in a mixer according to the compositions shown in Table 1 so as to obtain the tire puncture sealants shown in Table 1. Note that the numerical values shown in Table 1 are parts by mass, described in terms of solid content, where a total solid content of the rubber latex and the resin emulsion is 100 parts by mass (for compounds that are liquids at room temperature, the net of that compound).

Each of the obtained tire puncture sealants were evaluated for sealing performance and storage performance according to the methods described below.

2. Test Methods (1) Sealing Performance

A puncture hole (diameter: 4 mm) was opened in a center groove portion of the tread of the tire. Then, the tire with the puncture hole was mounted on a drum tester, the tire puncture sealant obtained as described above was injected via the valve, and the tire was inflated with air to an internal pressure of 150 kPa. Thereafter, intermittent running cycles in which the tires were run for 1 minute then stopped under a load of 350 kg and at a speed of 30 km/hr were performed until air leakage ceased. Whether air was leaking or not was confirmed visually and also by spraying soapy water around the puncture hole.

Test results were evaluated according to the following scale. ☉: Puncture hole sealed within three intermittent running cycles; ○: Puncture hole sealed in 4 to 6 cycles; ◇: Puncture hole sealed in 7 to 9 cycles; and x: Puncture hole did not seal even after 10 cycles.

The evaluations are shown on the sealing performance row of Table 1.

2. Storage Performance

The obtained tire puncture sealants were placed in a container, nitrogen substituted, and then sealed. The sealed containers were left to sit for 30 days at 80° C.

Thereafter, the state of each of the tire puncture sealants was observed, the state of dispersion was visually observed, and each of the tire puncture sealants was evaluated according to the following scale. ○: Agglomerates did not form and tire puncture sealant was stable; ◇: Skin formed on surface of the tire puncture sealant; x: Agglomerates formed.

The evaluations are shown on the storage performance row of Table 1.

(3) Injectability

The obtained tire puncture sealants were heated to 70° C., and 650 g thereof was injected using the compressed air of a compressor. Thereafter, air pressure was increased until the pressure gauge of the compressor read 250 kPa. After increasing the pressure, compressed air injection from the compressor was stopped and the value displayed on the pressure gauge of the compressor was read. Each tire puncture sealant was then evaluated according to the following scale based on the amount of drop in pressure from 250 kPa. ☉: Pressure dropped 10 kPa or less; ○: Pressure dropped from 11 to 40 kPa; ◇: Pressure dropped from 41 to 70 kPa; x: Pressure dropped 71 kPa or more.

The evaluations are shown on the injectability row of Table 1.

3. Explanation of Test Results and Evaluations (1) Overall Evaluation

Tire puncture sealants that had at least one performance factor evaluated "☉" and had at least two performance factors evaluated "◇" or, rather, did not receive any "x" evaluations were given a score of "A". Tire puncture sealants that had three performance factors evaluated "○" were given a score of "B". Tire puncture sealants that had at least one performance factor evaluated "◇" or that included an "x" were given a score of "C". Scores of "A" and "B" were considered passing scores, and a score of "C" was considered a failing score.

(2) Explanation of the Working Examples and Comparative Examples

Comparing Working Examples 1 to 10 with Comparative Examples 1 and 2, it is clear that injectability is enhanced while ensuring sealing performance and storage performance by including the acetylene alcohol and/or derivative thereof.

It is also clear from the results of Working Examples 1 to 4 that injectability is enhanced while ensuring sealing performance and storage performance by including the acetylene alcohol and/or derivative thereof at a total amount of at least from 0.1 to 10 parts by mass per 100 parts by mass of a total solid content of the rubber latex and the resin emulsion.

Comparing the results of Working Example 5 with Working Examples 1 to 4, it is clear that the acetylene alcohol and/or derivative thereof that provides the desired effect is not limited to a specific substance.

It is also clear from the results of Working Example 6 that the desired effects are provided even if an acrylic resin emulsion is used in place of the EVA emulsion as the resin emulsion.

Moreover, it is clear from the results of Working Examples 7 and 10 that sealing performance is further enhanced via combined use of the VEVA emulsion. It is clear that when the solid content ratio of the NR latex to the EVA emulsion is 70/30, such as in Working Examples 8 and 9, sealing performance is enhanced, and when the solid content ratio is 20/80, injectability is enhanced.

TABLE 1

|  | Working Examples |  |  |  |  |  |  |  |  |  | Comparative Examples |  |
|---|---|---|---|---|---|---|---|---|---|---|---|---|
|  | 1 | 2 | 3 | 4 | 5 | 6 | 7 | 8 | 9 | 10 | 1 | 2 |
| Rubber latex 1 | 50 | 50 | 50 | 50 | 50 | 50 | 50 | 70 | 20 | 50 | 50 | 50 |
| Resin emulsion 1 | 50 | 50 | 50 | 50 | 50 |  | 25 | 30 | 80 |  | 50 |  |
| Resin emulsion 2 |  |  |  |  |  |  | 25 |  |  | 50 |  | 50 |
| Resin emulsion 3 |  |  |  |  |  | 50 |  |  |  |  |  |  |
| Acetylene alcohol 1 | 0.1 | 1 | 5 | 10 |  | 5 | 5 | 5 | 5 | 5 |  |  |
| Acetylene alcohol 2 |  |  |  |  | 5 |  |  |  |  |  |  |  |

TABLE 1-continued

|  | Working Examples | | | | | | | | | | Comparative Examples | |
| --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 |
| Antifreezing agent 1 | 110 | 110 | 110 | 110 | 110 | 110 | 110 | 110 | 110 | 110 | 110 | 110 |
| Surfactant 1 | 3 | 3 | 3 | 3 | 3 | 3 | 3 | 3 | 3 | 3 | 3 | 3 |
| Sealing performance | ○ | ○ | ○ | ○ | ○ | ○ | ⊙ | ⊙ | ○ | ⊙ | ○ | ⊙ |
| Storage performance | ○ | ○ | ○ | ○ | ○ | ○ | ○ | ○ | ○ | ○ | ○ | ○ |
| Injectability | ○ | ○ | ○ | ⊙ | ○ | ○ | ⊙ | ○ | ⊙ | ⊙ | X | ◊ |
| Evaluation | B | B | B | A | B | B | A | A | A | A | C | C |

The constituents listed in Table 1 are described below.
Rubber latex 1: Natural rubber latex (Hytex ® HA, manufactured by Fulflex, Inc. and available from Nomura Trading Co., Ltd.; Solid content = 60 mass %)
Resin emulsion 1: Ethylene-vinyl acetate copolymer resin emulsion (Sumikaflex ® 408HQE, manufactured by Sumika Chemtex Co., Ltd.; Solid content = 50 mass %)
Resin emulsion 2: Ethylene-vinyl acetate-vinyl versatate copolymer resin emulsion (Sumikaflex ® 950HQ, manufactured by Sumika Chemtex Co., Ltd.; solid content = 53 mass %)
Resin emulsion 3: Acrylic resin emulsion (AD-94, manufactured by Nissin Chemical Co., Ltd.; solid content = 48 mass %; pH = 6.0)
Acetylene alcohol 1: Olfine ® EXP. 4200, manufactured by Nissin Chemical Co., Ltd. [a mixture of the compounds expressed by the Formulas (1) and (2); in the formulas, $R^1$, $R^2$, and $R^3$ are each independently an alkyl group having from 1 to 5 carbons; $A^1$, $A^2$, and $A^3$ are each independently an alkylene glycol group having from 2 to 3 carbons; and x, y, and z are integers from 0 to 60. Note that when x, y, and z are integers of not less than 2, the plurality of $A^1$, $A^2$, and $A^3$, which correspond respectively, are the same; different composition from Olfine ® EXP. 4123, below]
Acetylene alcohol 2: Olfine ® EXP. 4123, manufactured by Nissin Chemical Co., Ltd. [a mixture of the compounds expressed by the Formulas (1) and (2); in the formulas, $R^1$, $R^2$, and $R^3$ are each independently an alkyl group having from 1 to 5 carbons; $A^1$, $A^2$, and $A^3$ are each independently an alkylene glycol group having from 2 to 3 carbons; and x, y, and z are integers from 0 to 60. Note that when x, y, and z are integers of not less than 2, the plurality of $A^1$, $A^2$, and $A^3$, which correspond respectively, are the same; different composition from Olfine ® EXP. 4200, above]
Antifreezing agent 1: Propylene glycol (manufactured by Wako Pure Chemical Industries, Ltd.; solid content = 100 mass %)
Surfactant 1: Polyoxyethylene oleyl ether (Emulgen 430, manufactured by Kao Corporation)

The tire puncture sealant of the present technology is usable across a wide range of temperatures and has superior sealing performance and, therefore, can especially be suitably used as a tire puncture sealant in a tire puncture repair kit or the like that is permanently stored in a vehicle.

What is claimed is:

1. A tire puncture sealant comprising a rubber latex and/or a resin emulsion, a compound expressed by the formula (1) below, a compound expressed by the formula (2) below, and an antifreezing agent:

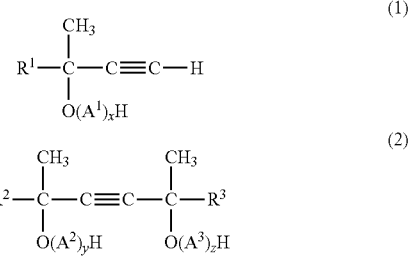

wherein $R^1$, $R^2$, and $R^3$ are each independently an alkyl group having from 1 to 8 carbons; $A^1$, $A^2$, and $A^3$ are each independently an alkylene glycol group having from 2 to 3 carbons; and x, y, and z are each independently an integer from 0 to 60; and when x, y, and z are integers of not less than 2, the plurality of $A^1$, $A^2$, and $A^3$, which correspond respectively, may each be the same or different.

2. The tire puncture sealant according to claim 1, wherein in Formulas (1) and (2), $R^1$, $R^2$ and $R^3$ are each independently an alkyl group having from 1 to 5 carbons.

3. The tire puncture sealant according to claim 1, wherein a total of from 0.1 to 10 parts by mass of the acetylene alcohol and/or the derivative thereof is included per 100 parts by mass of a total solid content of the rubber latex and the resin emulsion.

4. The tire puncture sealant according to claim 1, wherein the resin emulsion is an ethylene-vinyl acetate copolymer resin emulsion.

5. The tire puncture sealant according to claim 4, wherein the rubber latex is a natural rubber latex, and a solid content compounding ratio, solid content mass of the natural rubber latex/solid content mass of the ethylene-vinyl acetate copolymer resin emulsion, of the natural rubber latex to the ethylene-vinyl acetate copolymer resin emulsion is from 70/30 to 20/80.

6. The tire puncture sealant according to claim 4, wherein the ethylene-vinyl acetate copolymer resin emulsion is an ethylene-vinyl acetate-vinyl versatate copolymer resin emulsion.

7. The tire puncture sealant according to claim 1, wherein the rubber latex comprises a deproteinized natural rubber latex.

8. The tire puncture sealant according to claim 1, wherein the resin emulsion is an ethylene-vinyl acetate-vinyl versatate copolymer resin emulsion obtained by copolymerizing an ethylene monomer and a vinyl acetate monomer using a water soluble emulsification dispersant.

9. The tire puncture sealant according to claim 8, wherein the emulsification dispersant is a polyvinyl alcohol.

10. The tire puncture sealant according to claim 8, wherein a molar ratio of the ethylene monomer to the vinyl acetate monomer compounded at copolymerization is from 10/90 to 40/60.

11. The tire puncture sealant according to claim 8, wherein a weight-average molecular weight of the ethylene-vinyl acetate copolymer resin in the ethylene-vinyl acetate copolymer resin emulsion is from 10,000 to 500,000, and a solid content of the ethylene-vinyl acetate copolymer resin emulsion is from 40 to 70 mass %.

12. The tire puncture sealant according to claim 8, wherein a weight-average molecular weight of the ethylene-vinyl acetate copolymer resin in the ethylene-vinyl acetate copolymer resin emulsion is from 50,000 to 200,000, and a solid content of the ethylene-vinyl acetate copolymer resin emulsion is from 50 to 65 mass %.

13. The tire puncture sealant according to claim 1, wherein $R^1$, $R^2$, and $R^3$ are each independently an alkyl group having from 1 to 3 carbons.

14. The tire puncture sealant according to claim 1, wherein the tire puncture sealant includes from 1 to 3 parts by mass, of the acetylene alcohol and/or derivative thereof per 100 parts by mass of a total solid content of the rubber latex and/or the resin emulsion.

15. The tire puncture sealant according to claim 1, comprising said antifreezing agent in an amount of from 100 to 150 parts by mass per 100 parts by mass of a total solid content of the rubber latex and/or the resin emulsion.

16. The tire puncture sealant according to claim 1, further comprising:
a gelling agent in an amount of from 1.0 to 3.0 parts by mass per 100 parts by mass of a total solid content of the rubber latex and/or the resin emulsion; and
a surfactant containing a carbonyl group.

17. The tire puncture sealant according to claim 8, wherein the tire puncture sealant comprises both the rubber latex and the resin emulsion, the rubber latex comprising a natural rubber latex and the resin emulsion comprising an ethylene-vinyl acetate copolymer resin emulsion, wherein a solid content compounding ratio of the natural rubber latex to the ethylene-vinyl acetate copolymer resin emulsion is in a range from 70/30 to 20/80.

18. The tire puncture sealant according to claim 17, wherein the solid content compounding ratio of the natural rubber latex to the ethylene-vinyl acetate copolymer resin emulsion is in a range from 50/50 to 20/80.

19. The tire puncture sealant according to claim 1, further comprising a tackifier selected from the group consisting of rosin resins, terpene resins, and hydrogenated terpene resins, wherein an amount of a solid content of the tackifier in the tire puncture sealant is from 10 to 30 parts by mass per 100 parts by mass of a total solid content of the rubber latex and/or the resin emulsion.

* * * * *